United States Patent Office 3,842,122
Patented Oct. 15, 1974

3,842,122
TREATING TAR SANDS BITUMEN
Ronald H. Wolk, Trenton, and Michael C. Chervenak, Pennington, N.J., assignors to Hydrocarbon Research, Inc., New York, N.Y.
Filed Dec. 29, 1972, Ser. No. 319,315
Int. Cl. C10g 1/00, 9/16, 23/00
U.S. Cl. 208—48 Q                                              1 Claim

ABSTRACT OF THE DISCLOSURE

The recovery of valuable liquid hydrocarbons from tar sands bitumen by hydroconversion in an upflow reactor is improved when downstream equipment, including liquid-gas separators, is operated under selected temperature and liquid velocity conditions to prevent coke formation and precipitation.

BACKGROUND OF THE INVENTION

In the U.S. patent, No. 3,151,054, to E. T. Layng, the recovery of fuel in the nature of heavy fuel oil from tar sands bitumen is described. An upflow, liquid phase hydrogenation system is used.

We have determined that different bitumens prepared by different extraction techniques behave differently in terms of their propensity to form coke deposits. These coke deposits are especially troublesome in downstream vapor-liquid separators. Information, discussed in this patent, has been developed that insures successful separator operation when hydroconverting bitumen feeds.

SUMMARY OF THE INVENTION

We have now determined that there is a critical combination of the temperature of the liquid phase in the reactor effluent vapor-liquid separator and the downflow liquid velocity in that separator that must be followed if coke formation in that separator is to be avoided. This correlation is based on a plot of the logarithm of the linear velocity against a linear temperature range which indicates that coke-free and coke-forming combination conditions exist. Some variation in the location of the line separating the coke-free and coke-forming zones will exist with bitumens of different characteristics as well as variations in the hydrogenation reactor conditions.

DESCRIPTION OF THE PREFERRED EMBODIMENT

Figure 1:
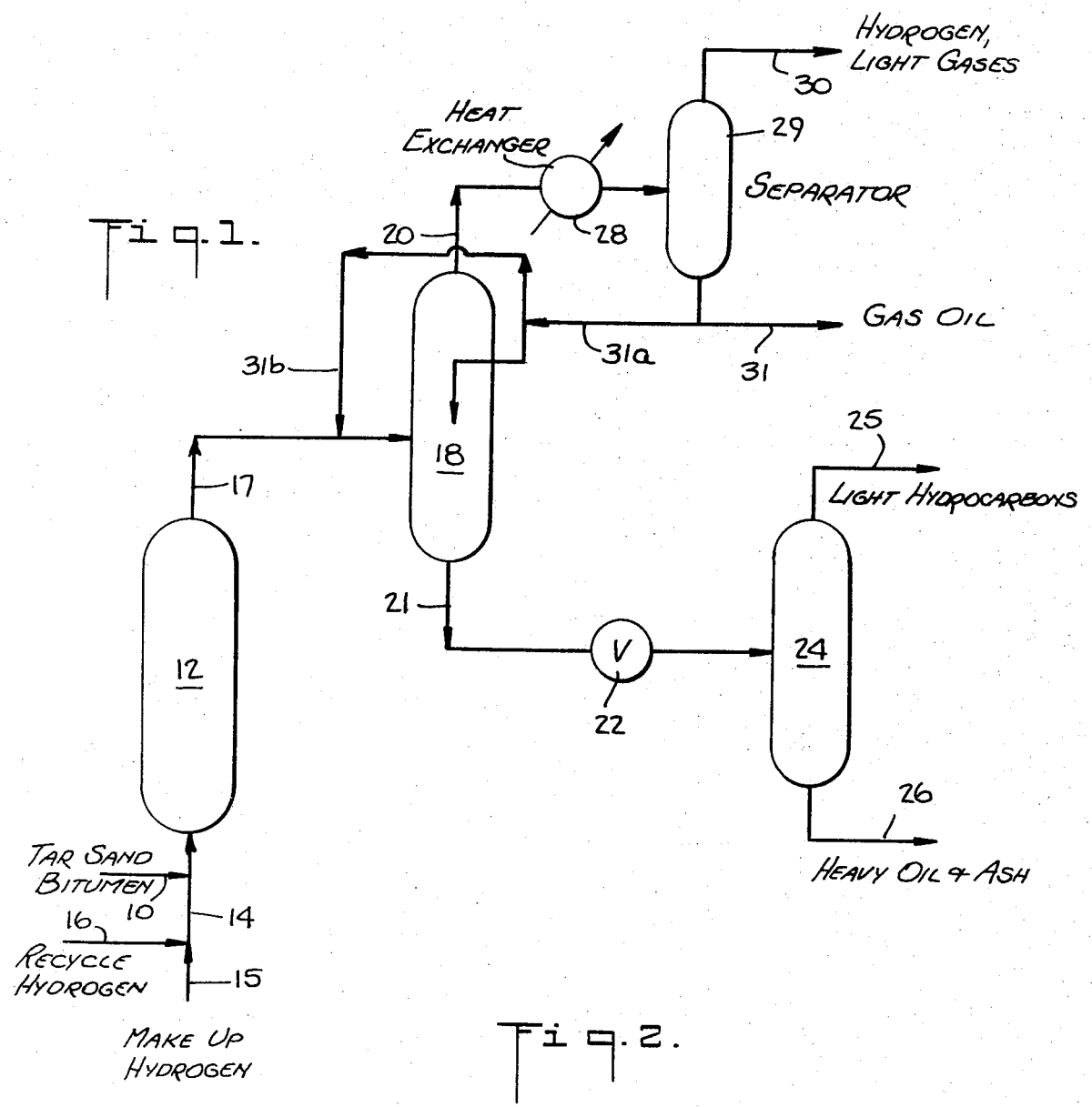
FIG. 1 of the drawing is a schematic figure of a preferred flow diagram for treating certain tar sands.

As more particularly shown in FIG. 1, a preheated natural tar bitumen feed including from 0.5 to 4 percent of silt, inorganic sand or the like, the particles of which are generally less than 325 mesh in size, is introduced through line 10 to a reactor 12 through line 14. A hydrogen rich gas (more than 60 percent hydrogen) is also introduced to the feed through line 14. This will include, as needed, a fresh make-up hydrogen in line 15 and a recycle hydrogen in line 16.

Conveniently, all of the liquid with the ash and the gas are taken overhead in line 17 and passed to the separator 18. In this separator 18, which is at substantially reactor pressure, there will be a phase separation of gas and vapors which are removed overhead in line 20 and the liquid and ash which will be removed as bottoms through line 21. The liquid is then passed through pressure reducing valve 22 to low pressure separator 24.

This separator chamber 24 is preferably operated at essentially atmospheric pressure to permit further removal of hydrogen and light hydrocarbons at 25, with the heavy oil containing the ash being removed at 26.

The vapors and gases that pass overhead at 20 from the high pressure separator 18 may be cooled at 28 and passed to separator 29, from which the gases such as hydrogen, methane, naphtha, etc. may be removed through overhead line 30. The hydrogen may be recovered by conventional processing and reintroduced in line 16.

The liquid fraction removed at 31 as bottoms from separator 29 is a gas oil boiling range material. This gas oil fraction may be injected into the liquid phase in separator 18 through line 31a to cause rapid cooling of the liquid phase. Alternately, it could be injected into line 17 through line 31b to quench the entire reactor effluent to the desired temperature. The amount of gas oil used is a function of the temperature at which it is injected and the desired temperature for the operation of the separator.

Under normal conditions, it is found that the hydrogen partial pressure in reactor 12 should be in the range of about 200 to 1500 p.s.i., hydrogen partial pressure. Temperatures will range from at least 700° F. but not to exceed about 950° F. Conversion of the 975° F. plus boiling range material to the material boiling below 975° F. will be in excess of 50%.

Figure 2:
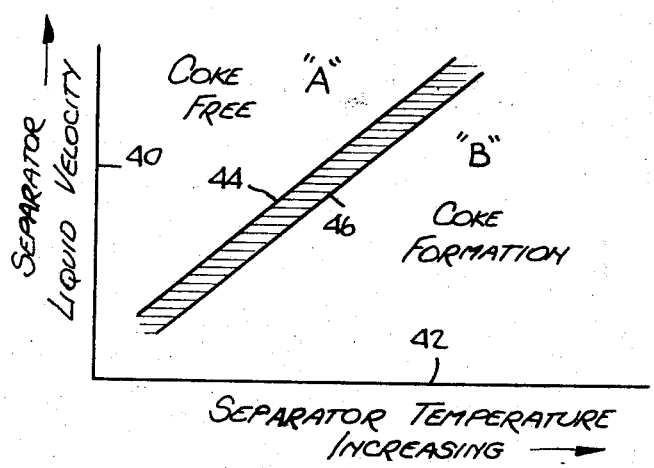
FIG. 2 is a graph of the coke-free versus coke-forming combination of conditions.

A total of eight experiments were run in which data on coke laydown in separators was obtained on three different bitumens. Three different bitumen feeds, designated 1, 2, and 3, were obtained from two different sources designated A and B. Coking in the separation zone was not encountered with feed 3B which contained 3.4 weight percent ash in Experiment I. Attempts to duplicate these experimental results in Experiment II were not successful with bitumen feed 1A which was obtained by a different extraction technique and contained 0.7 weight percent ash. The effect of the ash concentration on the coke laydown was evaluated in Experiment III. Feed 2A, containing 3.1 weight percent ash, was run and coke was obtained in the separation zone. This result indicated that the difference in the ash left in the bitumen after its extraction from the tar sand was not by itself sufficient to prevent coke laydown. Experiment IV was then run with a hydrogen partial pressure in the reactor of 1200 p.s.i.g. instead of the 750 p.s.i.g. used for the first three experiments. All of these four experiments were at 68–73 percent conversion. The increase in pressure did not prevent coke laydown in the separation zone. Experiments V through VIII were made at various separator temperature and liquid velocity combinations in an attempt to define operable conditions. A plot of all the temperature and liquid velocity data, presented at FIG. 2, shows that there are two distinct zones defining conditions for coke laydown and coke-free operation for the separator. The data suggest that high ash feeds may be less likely to lay down coke than low ash feeds. However, in order to guarantee coke-free operation of the separator, it is necessary to stay above the minimum velocity and below the maximum temperature indicated by the lines in FIG. 2.

TABLE I

Certain bitumens recovered from Athabasca tar sand have essentially the following characteristics:

| Bitumen number | 1 | 2 | 3 |
|---|---|---|---|
| Bitumen source | A | A | B |
| Gravity, ° API | 9.1 | 5.6 | 5.5 |
| Sulfur, w., percent | 4.64 | 4.84 | 4.85 |
| Ash, w., percent | 0.79 | 3.09 | 3.38 |
| Carbon, w., percent | 83.35 | 81.8 | 80.8 |
| Hydrogen, w., percent | 10.53 | 10.39 | 10.29 |
| Metals (V plus Ni), p.p.m. | 210 | 193 | 253 |
| Nitrogen, p.p.m. | 3,900 | 3,700 | 4,100 |

TABLE II.—EXAMPLES OF RUNS

| Experiment | I | II | III | IV | V | VI | VII | VIII |
|---|---|---|---|---|---|---|---|---|
| Bitumen number and source | 3B | 1A | 2A | 1A | 1A | 1A | 1A | 1A |
| Reactor temperature, °F | 840 | 835 | 839 | 840 | 805 | 805 | 805 | 805 |
| Hydrogen partial pressure in reactor, p.s.i. | 750 | 750 | 760 | 1200 | 750 | 750 | 750 | 750 |
| Conversion, volume percent (disappearance of 975° F., plus feed) | 72 | 68 | 73 | 72 | 58 | 58 | 58 | 58 |
| Separator temperature, °F | 700 | 675 | 800 | 800 | 550 | 650 | 700 | 800 |
| Separation zone condition | Clean | Coked | Coked | Coked | Clean | Coked | Clean | Clean |
| Liquid phase velocity in separation zone, ft./sec. | 0.002 | 0.002 | 0.004 | 0.004 | 0.002 | 0.001 | 0.50 | 0.80 |

The ordinate 40 is laid out on a log-log scale of superficial linear velocity of the downflowing liquid in separator 18 and the abscissa 42 is laid out as a linear temperature scale. The curves 44–46, which are relatively close depending on the bitumen, formed a demarkation line between the area "A" which proved to be representative of coke-free conditions, and area "B," which generally showed objectionable coke formation.

It has been found essential to keep the effluent in the separator 18 down to a temperature between about 500 and 800° F. and to maintain the downflow linear liquid velocity between 0.006 and 1.0 foot per second. The lower temperature corresponds to the lower velocity as shown on the curves in FIG. 2. An approximate linear relation appears to exist between the lowest combination of conditions and the highest combination.

While we have shown a preferred form of embodiment, we are aware that modifications may be made thereto and we, therefore desire a broad interpretation of the invention within the scope and spirit of the disclosure herein and the claim appended thereinafter.

We claim:
1. In a process for refining a tar sand derived material selected from the group consisting of natural tar and bitumen, which refining process includes the steps of passing the feed substantially in the liquid phase through a reaction zone in the presence of a hydrogen-containing gas under temperature in the range of 700 to 950° F. and hydrogen partial pressure in the range of 200 to 1500 p.s.i. wherein the effluent is removed from the reaction zone and passed to a separation zone and wherein the effluent is separated into at least a vapor fraction and a liquid fraction, the improvement which comprises:

(a) maintaining a temperature in the separation zone in the range of 500° F. to 800° F.;
(b) maintaining the superficial linear velocity of the downflowing liquid in separation zone in the range of 0.006 to 1.0 foot per second the lower temperature requiring the lower velocity;
(c) the range of temperature versus liquid velocity being a substantially linear relation of temperature versus a log-log scale of downflow liquid velocity;
(d) the space velocity of the feed through the reaction zone and the temperature being such that at least 50 percent of the feed boiling above 975° F. is converted to material boiling below 975° F.;
(e) and thereby avoiding coking of the separator.

References Cited
UNITED STATES PATENTS

| | | | |
|---|---|---|---|
| 3,151,054 | 9/1964 | Layng | 208—11 |
| 3,224,959 | 12/1965 | Schlinger et al. | 208—107 |
| 3,544,447 | 12/1970 | Van Driesen | 208—48 |
| 3,553,105 | 1/1971 | Layng et al. | 208—213 |
| 3,560,372 | 2/1971 | Van Driesen | 208—48 |
| 3,639,230 | 2/1972 | Oguchi et al. | 208—213 |
| 3,725,247 | 4/1973 | Johnson et al. | 208—111 |

DELBERT E. GANTZ, Primary Examiner

G. E. SCHMITKONS, Assistant Examiner

U.S. Cl. X.R.

208—48 R, 107, 157, 159